US006964262B2

(12) United States Patent
Hayakawa

(10) Patent No.: US 6,964,262 B2
(45) Date of Patent: Nov. 15, 2005

(54) ACCUMULATOR FUEL INJECTION SYSTEM CAPABLE OF PREVENTING ABNORMALLY HIGH PRESSURE

(75) Inventor: Yoshiki Hayakawa, Kuwana (JP)

(73) Assignee: Denso Corporation, Kariya (JP)

( * ) Notice: Subject to any disclaimer, the term of this patent is extended or adjusted under 35 U.S.C. 154(b) by 33 days.

(21) Appl. No.: 10/816,907

(22) Filed: Apr. 5, 2004

(65) Prior Publication Data

US 2004/0200455 A1  Oct. 14, 2004

(30) Foreign Application Priority Data

Apr. 8, 2003 (JP) ............................. 2003-104065

(51) Int. Cl.$^7$ .......................................... F02M 37/04
(52) U.S. Cl. ............. 123/458; 123/179.16; 123/179.17
(58) Field of Search ........................ 123/457–8, 179.16, 123/179.17

(56) References Cited

U.S. PATENT DOCUMENTS

| 5,425,342 | A | * | 6/1995 | Ariga et al. ................ 123/456 |
| 5,572,964 | A | * | 11/1996 | Cogneville et al. .... 123/179.17 |
| 5,727,515 | A | * | 3/1998 | Biester .................... 123/198 D |
| 5,758,622 | A | * | 6/1998 | Rembold et al. ........... 123/456 |
| 5,794,586 | A | * | 8/1998 | Oda et al. .................... 123/305 |
| 6,021,763 | A | * | 2/2000 | Yoshihara et al. .......... 123/516 |
| 6,024,064 | A | * | 2/2000 | Kato et al. ............. 123/179.17 |
| 6,408,822 | B1 | * | 6/2002 | Rembold et al. ........... 123/447 |
| 2004/0237938 | A1 | * | 12/2004 | Oono et al. .................. 123/457 |

FOREIGN PATENT DOCUMENTS

JP          2001-295685          10/2001

* cited by examiner

*Primary Examiner*—Thomas Moulis
(74) *Attorney, Agent, or Firm*—Nixon & Vanderhye P.C.

(57) ABSTRACT

An accumulator fuel injection system 1 comprises a PC sensor 21 for detecting a common rail pressure, a pressure limiter 22 for keeping the common rail pressure below a high limit pressure by opening its valve when the common rail pressure exceeds the high limit pressure, and an ECU 14 for controlling flow rate of fuel to be injected from an injector 13 so that the common rail pressure reaches the high limit pressure when an engine is started in a state in which an abnormality has occurred in the supply under pressure by a supply pump 12. It is possible to keep the common rail pressure within an actually used region by opening the pressure limiter after the engine is started, even in a state in which a full open abnormality has occurred at a suction flow control valve 15.

9 Claims, 2 Drawing Sheets

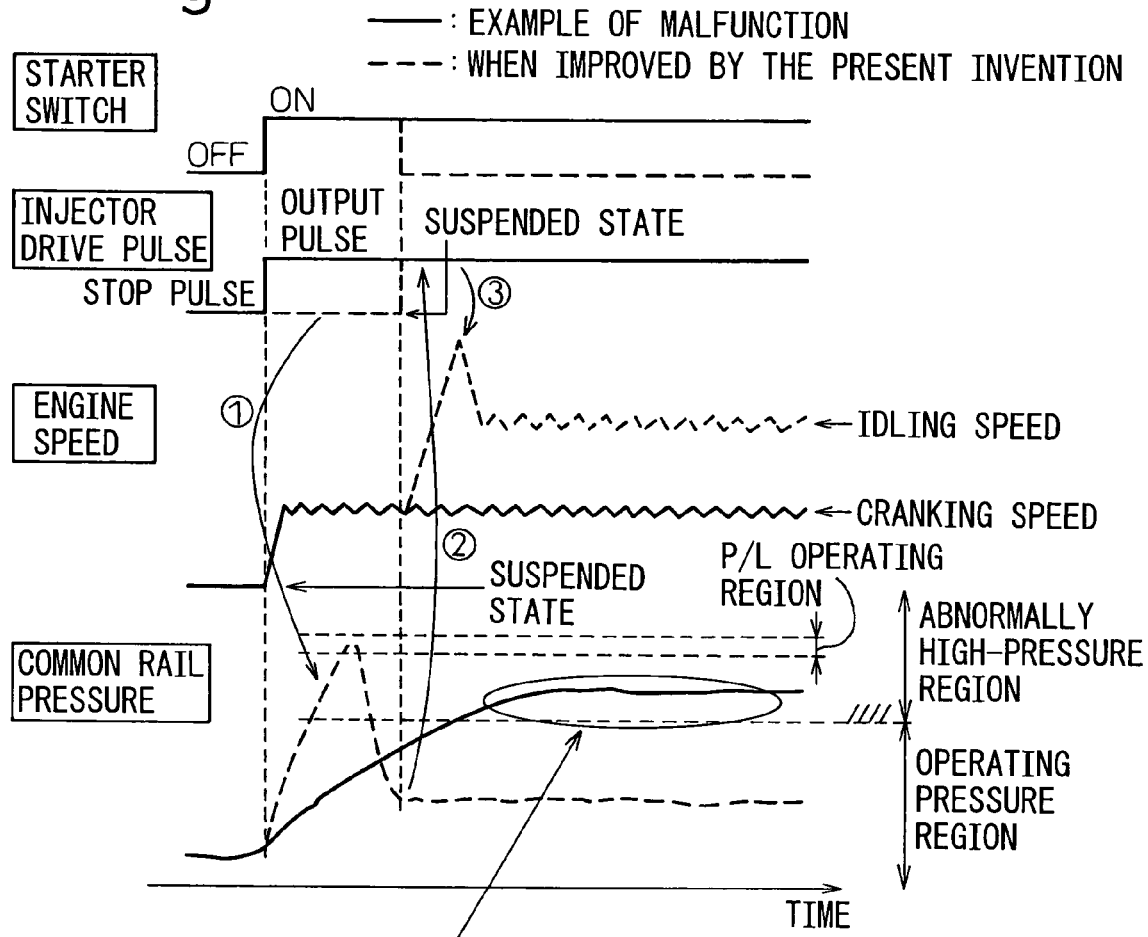

ACCUMULATOR FUEL INJECTION SYSTEM CAPABLE OF PREVENTING ABNORMALLY HIGH PRESSURE

BACKGROUND OF THE INVENTION

1. Field of the Invention

The present invention relates to an accumulator fuel injection system for injecting a fuel from a common rail, in which a high-pressure fuel supplied under pressure by a fuel supply pump is accumulated under pressure, into each cylinder of an internal combustion engine, such as a diesel engine, through a fuel injection valve.

2. Description of the Related Art

Conventionally, in a widely known accumulator fuel injection system (for example, refer to Patent document 1), a high-pressure fuel is supplied under pressure to a common rail, and is accumulated under pressure therein, by a fuel supply pump (hereinafter referred to as the supply pump) rotatably driven by an internal combustion engine such as a diesel engine (hereinafter referred to as the engine), and, at the same time, the high-pressure fuel accumulated in the common rail under pressure is distributed to two or more electromagnetic fuel injection valves (hereinafter referred to as injectors). Each of the electromagnetic fuel injection valves is mounted on each cylinder of the engine and the high-pressure fuel is supplied by injection to each cylinder of the engine through these injectors.

Here, a fuel path leading from a fuel tank to a pressure chamber of the supply pump is provided with a suction flow control valve. The suction flow control valve is an electromagnetic actuator, which changes the flow rate of the high-pressure fuel to be supplied under pressure to the common rail from the pressure chamber of the supply pump by adjusting the flow rate of fuel sucked into the pressure chamber. The flow rate of the sucked fuel is adjusted by adjusting the period of time during which a valve body is lifted or the opening degree of the valve-port area, in accordance with a current applied to a pump drive circuit.

The suction flow control valve employs a normally-open electromagnetic valve, the opening degree of which reaches a full open state when the supply of current is suspended. Because of this, when an abnormal condition, such as breakage of a cable in a wire harness for transmitting a pump drive signal, occurs, the suction flow control valve abnormally fully opens (this abnormal state is referred to the "full open abnormality" hereinafter), and the supply pump excessively supplies a high-pressure fuel under pressure. Under this condition, the fuel pressure in the high-pressure piping path leading from the pressure chamber of the supply pump to the oil reservoir of the injector of each cylinder via the common rail, especially the fuel pressure in the common rail, may exceed a high limit pressure over which the common rail is not allowed to operate. Therefore, a pressure safety valve (hereinafter referred to as a pressure limiter), which opens when the fuel pressure in the common rail exceeds the high limit pressure, is attached to the common rail in preparation for such an abnormally high pressure and thus the reliability of an accumulator fuel injection system is ensured.

[Patent Document 1]

Japanese Unexamined Patent Publication (Kokai) No. 2001-295685

However, in a conventional accumulator fuel injector system, there may be a case where the pressure limiter does not open even if an abnormally high pressure is produced in the accumulator fuel injector system because of the full open abnormality of the flow control valve. In other words, there may be a case where the common rail pressure remains at a higher pressure (abnormally high-pressure region) than an operating pressure (actually used pressure), even though a pressure limiter (P/L) operating pressure region is not reached, as shown by the change in the fuel pressure in the common rail (hereinafter referred to as the common rail pressure) denoted by the solid line in FIG. 2.

For example, when the flow rate of fuel to be supplied to the common rail under pressure (flow rate of fuel to be discharged by the supply pump) is low and the flow rate of fuel to be injected by and the flow rate of fuel leaking from the injector are high, the common rail pressure is kept in the abnormally high-pressure region. Particularly, when an engine speed (revolution) is low such as when the engine is started (cranked), even if a full open abnormality occurs at the suction flow control valve, the flow rate of fuel to be sucked into the pressure chamber of the supply pump does not increase beyond a limit determined by the engine speed. Because of this, there is the possibility that the common rail pressure is kept in the abnormally high-pressure region.

Under this condition, the pressure in the high-pressure piping path is kept high, even though an allowable pressure of the supply pump and the injector is not exceeded. Because of this, there is the possibility of performance degradation of the supply pump and the injector and occurrence of malfunctions, such as a fuel leakage at piping connecting parts or sealing parts in the high-pressure side fuel path. This causes a problem in that the reliability of the accumulator fuel injection system is degraded.

SUMMARY OF THE INVENTION

The object of the present invention is to provide an accumulator fuel injection system with higher reliability by preventing performance degradation of a supply pump and an injector caused by an abnormally high pressure in the accumulator fuel injection system resulting from an excessive supply of fuel under pressure by the supply pump and preventing malfunctions, such as a fuel leakage at piping connecting parts or sealing parts, in the high-pressure side fuel path.

According to a first aspect of the present invention, when an engine is started in a state in which detected value of a common rail pressure is in an abnormally high-pressure region, flow rate of fuel to be injected from an injector is controlled so that the common rail pressure reaches the high limit pressure.

In this way, as the common rail pressure can be increased by starting the engine even in an abnormal state in which a suction flow control valve of a supply pump abnormally fully opens (this abnormal state is referred to the "full open abnormality"), it is possible to keep the common rail pressure within an operating pressure range (or region) (actually used region) by opening a pressure limiter without fail. Therefore, it is possible to improve the reliability of an accumulator fuel injection system by reducing the possibility of performance degradation of the supply pump and injector resulting from an abnormally high pressure in the accumulator fuel injection system and the possibility of occurrence of malfunctions, such as a fuel leakage at piping connecting parts or sealing parts in the high-pressure side fuel path.

According to a second aspect of the present invention, when an engine is started in a state in which the detected value of the common rail pressure is in an abnormally high-pressure region (range), the common rail pressure is increased by suspending fuel injection from the injector in every cylinder.

In this way, effects similar to those of the first aspect can be obtained.

According to a third aspect of the present invention, when an engine is started in a state in which the detected value of the common rail pressure is in an abnormally high-pressure region, the common rail pressure is increased by suspending fuel injection from an injector in some cylinders.

In this way, effects similar to those of the second aspect can be obtained and, at the same time, it is possible to determine the number of cylinders at which fuel injection is suspended by taking into consideration the balance between the flow rate of fuel to be discharged by a supply pump and the flow rate of fuel to be injected by an injector.

According to a fourth aspect of the present invention, after an engine is started in a state in which the detected value of the common rail pressure is in an abnormally high-pressure region, if the detected value of the common rail pressure falls below the lower limit of the abnormally high-pressure region because of opening of a pressure limiter, fuel injection is started in the cylinders in which fuel injection from the injector has been suspended.

According to a fifth aspect of the present invention, after an engine is started in a state in which the detected value of the common rail pressure is in an abnormally high-pressure region, when the detected value of the common rail pressure falls below the lower limit of the abnormal high pressure region because of opening of the pressure limiter, the number of cylinders in which fuel injection is started is increased step by step.

In this way, as the flow rate of fuel to be injected from the common rail can be increased step by step after fuel injection is started, it is possible to prevent the common rail pressure from hunting with a large amplitude.

According to a sixth aspect of the present invention, when an engine is started in a state in which the detected value of the common rail pressure is in an abnormally high-pressure region, fuel injection is started when a predetermined period of time elapses after the engine is started.

In this way, it is possible to start fuel injection by means of a very simple method using a timer.

According to a seventh aspect of the present invention, the predetermined period of time, after which fuel injection is started, is changed by learning.

In this way, it is possible to determine the optimum period of time after which fuel injection is started by taking into consideration the period of time required for the common rail pressure to fall within the operating pressure range by operation of a pressure limiter.

According to an eighth aspect of the present invention, when an engine is started in a state in which the detected value of a common rail pressure is in an abnormally high-pressure region, if the common rail pressure is judged to be stable by monitoring the detected value of the common rail pressure, fuel injection is started.

In this way, it is possible to determine conditions for judging whether the common rail pressure is stable, in accordance with the characteristics and operating condition of each accumulator fuel injection system.

In a ninth aspect of the present invention, conditions for judging whether the common rail pressure is stable are changed by learning.

In this way, it is possible to optimize the conditions for judging whether the common rail pressure is stable.

The present invention may be more fully understood from the description of the preferred embodiments of the invention set forth below, together with the accompanying drawings.

BRIEF DESCRIPTION OF THE DRAWINGS

In the drawings:

FIG. 2 is a diagram showing the operating conditions of an accumulator fuel injection system in the embodiment.

DESCRIPTION OF THE PREFERRED EMBODIMENTS

[Configuration in Embodiments]

Figure 1:
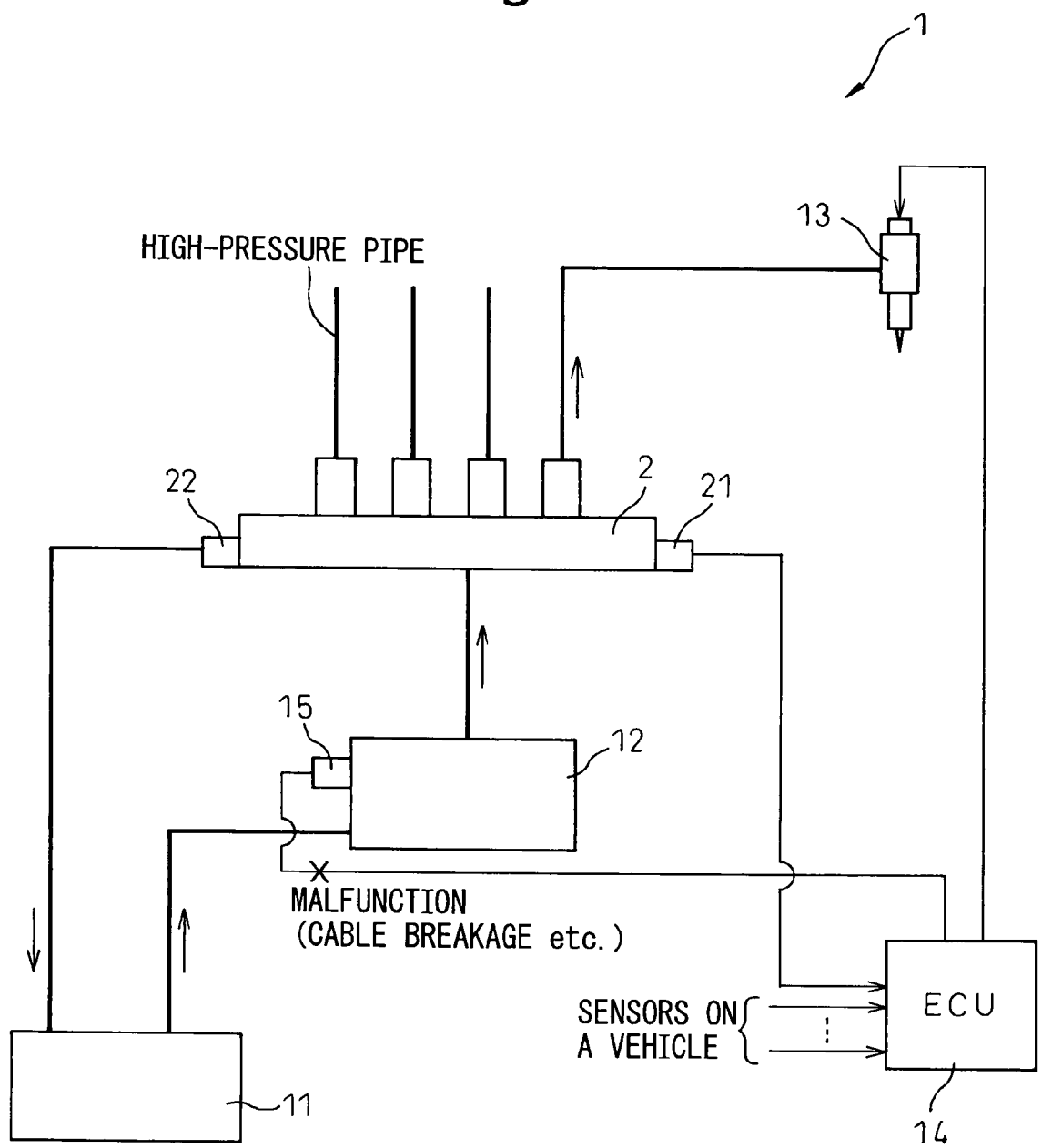
FIG. 1 is a general block diagram showing the entire configuration of an accumulator fuel injection system in an embodiment of the present invention.

An embodiment of the present invention is explained with reference to FIG. 1 and FIG. 2. An accumulator fuel injection system 1 of the present invention injects fuel into each cylinder of an engine mounted on a vehicle, such as an automobile, and comprises a fuel tank 11, a supply pump 12, a common rail 2, an injector 13, an ECU 14, etc., as shown in FIG. 1, The supply pump 12 is a high-pressure supply pump for sucking in and pressurizing fuel in the fuel tank 11 and discharging it, as high-pressure fuel, to the common rail 2. The supply pump 12 has a feed pump (low-pressure supply pump), cams, at least a plunger, at least a pressure chamber, at least a discharge valve, etc.

The feed pump is a widely known pump for pumping the fuel in the fuel tank 11 and is driven by the rotation of the driving shaft of the supply pump 12. The driving shaft of the supply pump 12 is connected to a crankshaft of the engine and is rotatably driven by the rotation of the crankshaft. The cams are rotatably driven by the rotation of the driving shaft and the plungers are driven by the rotation of the cams so as to reciprocate between the upper dead center and the lower dead center. The pressure chamber is made of the plunger and a cylinder in which the plunger reciprocates slidably. The fuel pumped by the feed pump is sucked into the pressure chamber and is pressurized therein. When the fuel pressure in the pressure chamber is increased into a pressure equal to or higher than a predetermined value, the discharge valve opens and the fuel whose pressure has been increased into a high pressure (high-pressure fuel) is discharged to the common rail 2.

The fuel path leading from the feed pump to the pressure chamber is provided with a suction flow control valve 15. The suction flow control valve 15 is an electromagnetic actuator for changing the flow rate of high-pressure fuel discharged from the supply pump 12 to the common rail 2 by adjusting the flow rate of fuel sucked into the pressure chamber. The adjustment of the flow rate of fuel sucked in to the pressure chamber is carried out by adjusting the opening degree of the fuel path in the suction flow control valve 15. The adjustment of the opening degree is electronically controlled by a pump drive signal sent from the ECU 14 via a pump drive circuit (not shown). By changing the flow rate of fuel discharged from the supply pump 12, the common rail pressure, that is, the fuel injection pressure to each cylinder of the engine from the injector 13, is controlled. The flow control valve 15 is a normally-open electromagnetic valve and is fully open when the supply of (electric) current is suspended.

The common rail 2 is a pressure accumulating container for accumulating a high-pressure fuel, the pressure of which corresponds to the fuel injection pressure to each cylinder of the engine. The common rail 2 comprises a common rail pressure sensor (referred to as the PC sensor) 21, a pressure limiter 22, etc. The PC sensor 21 is a fuel pressure detecting means for detecting the common rail pressure and the detected sensor signal, that is, the detected value of the common rail pressure, is transmitted to the ECU 14.

The pressure limiter 22 is a pressure safety valve for escaping the high-pressure fuel into the fuel tank 11 to decrease the pressure when the common rail pressure exceeds a high limit pressure. After opening, when the common rail pressure exceeds the high limit pressure, the pressure limiter 22 closes when the pressure falls to or below a predetermined value. The pressure limiter 22 comprises a substantially cylindrical housing, a valve body (valve housing body), a valve needle (valve), a spring, etc.

The housing is connected liquid-tightly between the left end portion of the common rail 2 shown in FIG. 1 and a relief pipe and the valve body is fixed on the front end of the housing nearer to the common rail 2. A valve port formed in the valve body is opened and closed by the valve needle and the spring biases the valve needle with a predetermined biasing force in the direction in which the valve needle is seated on the valve seat (the direction in which the valve is closed). The valve opening pressure at which the pressure limiter 22 opens is determined based on the seat diameter of the valve needle and the set load of the spring.

The injector 13 is an electromagnetic fuel injection valve comprising a nozzle, an electromagnetic actuator, a spring, a command piston, etc., and is connected to the downstream ends of two or more high-pressure pipes branching from the common rail 2. The nozzle comprises a nozzle body having an injection port and a nozzle needle for opening and closing the injection port. The nozzle needle is supported slidably within the nozzle body. The electromagnetic actuator drives the nozzle needle in the valve opening direction when a current is supplied. The spring is always biasing the nozzle needle in the valve closing direction. The command piston is formed integrally with the nozzle needle and forms a backpressure control chamber and drives the nozzle needle in the valve closing direction when it receives the backpressure of the high-pressure fuel.

Fuel injection from the injector 13 to each cylinder of the engine is electronically controlled by the supply of current to and the suspension of current supply to an injection control electromagnetic valve (hereinafter referred to as the electromagnetic valve), which is an electromagnetic actuator. In other words, while a current is being supplied to the electromagnetic valve, the nozzle needle is driven in the valve opening direction and the high-pressure fuel in the common rail 2 is supplied by injection to each cylinder of the engine. When the supply of current is suspended, the backpressure of the high-pressure fuel applied to the command piston increases and the nozzle needle is closed, resulting in the suspension of the supply of the high-pressure fuel by injection. In this embodiment fuel leaking from the injector 13 and fuel discharged from the backpressure control chamber return to the fuel tank 11.

The ECU 14 is an engine control unit for electronically controlling the supply pump 12 and the electromagnetic actuator of the injector 13. The ECU 14 comprises a microcomputer having a widely known configuration. The microcomputer includes functions of a CPU for carrying out control processes and calculation processes, a memory unit for storing various control programs and data, an input circuit, an output circuit, a power supply circuit, an injector drive circuit, a pump drive circuit, etc. The unit 14 is input with sensor signals from various sensors, such as the PC sensor 21, which have been A/D-converted in an A/D converter.

To the ECU 14, a starter current supply circuit for supplying a current to a starter is connected, which serves as an engine start device for starting an engine. When the engine key is inserted into a key cylinder and turned to the ST position, a starter switch is turned on and a starter relay of the starter current supply circuit is turned on. Due to this, the engine is cranked and started. When the starter switch is turned on, or the engine key is returned to the IG position and the ignition switch is turned on after the engine is cranked, the electromagnetic valve of the injector 13, the suction flow control valve 15 of the supply pump 12 and the actuators of respective control components, such as the starter relay of the starter current supply circuit, are electronically controlled based on the various control programs.

The ECU 14 comprises an injection flow rate and timing determining means for determining the optimum flow rate and timing of injection in accordance with the operating condition and operating state of the engine, an injection duration determining means for determining the duration of injection in accordance with the operating condition of the engine and the flow rate of injection, an injector drive means for supplying a current to the electromagnetic valve of each injector 13 via the injector drive circuit, etc. In other words, the flow rate and timing of injection are calculated in accordance with the engine speed, the opening degree of accelerator, etc. and, further, the duration of injection is calculated in accordance with the common rail pressure and the flow rate of injection. The fuel is injected into each cylinder by inputting a pulse signal (injector drive pulse), corresponding to the time period of fuel injection, to the electromagnetic valve of the injector 13.

Further, the ECU 14 comprises a discharge flow rate change means for changing the flow rate of high-pressure fuel to be discharged from the supply pump 12 to the common rail 12. The discharge flow rate change means first calculates the optimum fuel injection pressure in accordance with the operating condition and operating state of the engine. Then, the flow rate of discharged fuel is changed so that the common rail pressure becomes substantially equal to the fuel injection pressure. In other words, the flow rate of fuel sucked into the pressure chamber is adjusted by adjusting the pump drive signal and outputting it to the suction flow control valve 15 so as to set the opening degree of the suction flow control valve 15 to that corresponding to the target flow rate of discharged fuel.

Still further, the ECU 14 comprises an abnormally high-pressure detecting means, a fuel pressure increasing means and a fuel injection starting means. The abnormally high-pressure detecting means detects that the detected value of a common rail pressure is in an abnormally high-pressure region, exceeding the lower limit of the abnormally high-pressure region set lower than a high limit pressure. The abnormally high-pressure region is a region of the common rail pressure in which there is the possibility of performance degradation of the supply pump 12 and the injector 13 and the possibility of occurrence of malfunctions, such as a fuel leakage at connecting parts or sealed parts in the high-pressure side fuel path. In other words, the abnormally high-pressure region is a region of the common rail pressure in which the reliability of the accumulator fuel injection system 1 is degraded.

The above-mentioned abnormally high pressure of the common rail pressure occurs when an excessive fuel supply under pressure from the supply pump 12 occurs, in other words, a full open abnormality of the suction flow control valve 15 occurs. The full open abnormality of the flow control valve 15 occurs when malfunctions, such as cable breakage in the wire harness for transmitting a pump drive signal, occur or when an output abnormality occurs in a microcomputer, and so on.

The fuel pressure increasing means controls the flow rate of fuel to be injected from the injector 13 so that the common rail pressure reaches the high limit pressure when an engine is started in a state in which the detected value of the common rail pressure has been found to be in an abnormally high-pressure region by the abnormally high-pressure detecting means. In other words, the fuel pressure increasing means increases the common rail pressure when an engine is started in a state in which the supply under pressure by the supply pump 12 has become abnormal resulting from the full open abnormality of the suction flow control valve 15 or the like.

To be specific, after an engine is started, outputting of an injector drive pulse is suspended at every cylinder in order to increase the common rail pressure. Due to this, fuel injection from the injector 13 is suspended at every cylinder and the common rail pressure is increased, and the common rail pressure is kept within an actually used region by opening the pressure limiter 22.

The fuel injection starting means starts fuel injection from the injector 13 when the detected value of the common rail pressure falls below the lower limit of the abnormally high-pressure region. To be specific, the fuel injection starting means starts outputting of an injector drive pulse at every cylinder when the detected value of the common rail pressure falls within the operating pressure range. Due to this, fuel injection starts simultaneously at the injectors 13 of all the cylinders and the engine speed is increased. By the way, the operating pressure range is a region (range) of the common rail pressure lower than the abnormally high-pressure region, and is a region in which the possibility of occurrence of various malfunctions in the abnormally high-pressure region is extremely small and in which the reliability of the accumulator fuel injection system 1 is not degraded.

[Function of the Embodiment]

The functions and characteristics of the present embodiment are explained with reference to FIG. 2. When the engine key is inserted into the key cylinder, and is turned to the ST position, and when the starter switch is turned on, the engine is cranked and started. While the engine is in a cranking state (while the engine is in operation at a cranking speed), outputting of an injector drive pulse is suspended and fuel is not injected. Because of this, the high-pressure fuel in the common rail 2 is not consumed and the common rail pressure is increased. When the common rail pressure exceeds the high limit pressure (the lower limit of the P/L operation region in FIG. 2), the pressure limiter 22 opens so as to keep the common rail pressure within the actually used region.

While the common rail pressure is kept within the operating pressure range, outputting of an injector drive pulse is started and fuel is injected. In the meantime, the engine speed increases from the cranking speed to an idling speed and, at the same time, the starter switch is turned off. In this way, starting of the engine is completed.

[Effects of the Embodiment]

As described above, when an engine is started in a state in which the detected value of the common rail pressure is in the abnormally high-pressure region, the common rail pressure is increased and the pressure limiter 22 is opened by suspending fuel injection from the injector 13 at every cylinder.

Due to this, as the common rail pressure can be increased by starting the engine even in a state in which a full open abnormality has occurred in the suction flow rate control valve of the supply pump 12, it is possible to keep the common rail pressure within the actually used region by opening the pressure limiter 22 without fail. Therefore, it is possible to improve the reliability of the accumulator fuel injection system by reducing the possibility of performance degradation of the supply pump 12 and the injector 13 resulting from an abnormally high pressure in the accumulator fuel injection system and occurrence of malfunctions such as a fuel leakage at connecting parts or sealing parts in the high-pressure side fuel path.

Then, when the detected value of the common rail pressure falls below the lower limit of the abnormally high-pressure region, fuel injection is started at the cylinders at which fuel injection from the injector 13 has been suspended. Due to this, when the common rail pressure is kept within the actually used region, fuel injection from the injector 13 can be started and, therefore, the common rail pressure can be stabilized within the operating pressure range.

[Other Embodiments]

The pressure limiter 22 in the present embodiment closes when the common rail pressure falls below a predetermined value after opening when the common rail pressure exceeds the high limit pressure, but the pressure limiter 22 may have a pressure regulating function. In this case, after opening once, the pressure limiter 22 controls the valve opening pressure so as to maintain a pressure (regulating pressure) required to allow a vehicle to continue traveling.

The fuel pressure increasing means in the present embodiment suspends fuel injection from the injector 13 at every cylinder in order to increase the common rail pressure, but fuel injection may be suspended in some of the cylinders by taking into consideration the balance between the flow rate of fuel discharged from the supply pump 12 and the flow rate of injection from the injector 13.

The fuel injection starting means in the present embodiment starts fuel injection from the injector 13 simultaneously at every cylinder, but the number of cylinders at which fuel injection is started may be increased step by step in order to prevent the common rail pressure from hunting.

The fuel injection starting means in the present embodiment starts fuel injection from the injector 13 when the common rail pressure falls below the lower limit of the abnormally high-pressure region, that is, when the common rail pressure falls within the actually used region, but fuel injection may be started when a predetermined period of time elapses after the engine is started (when the starter switch is turned on) by using a simple timer system. In this case, the accumulator fuel injection system 1 may comprise a start condition learning means capable of changing the setting of the predetermined period of time by learning.

Further, fuel injection may be started when the common rail pressure is judged to be stable by monitoring the detected value of the common rail pressure. In this case, the accumulator fuel injection system 1 may comprise a start condition learning means capable of changing the conditions for judging whether the common rail pressure is stable, by learning. The conditions for judging whether the common rail pressure is stable include whether the common rail pressure falls below a predetermined value in the actually used region, whether the common rail pressure stays within the actually used region for a predetermined period of time or longer, and so on.

While the invention has been described by reference to specific embodiments chosen for the purposes of illustration, it should be apparent that numerous modifications could be made thereto, by those skilled in the art, without departing from the basic concept and scope of the invention.

What is claimed is:

1. An accumulator fuel injection system comprising:
   a fuel supply pump driven by an internal combustion engine and supplying a fuel under pressure;
   a common rail for accumulating a high-pressure fuel supplied under pressure by the fuel supply pump;
   at least a fuel injection valve for injecting a fuel into a corresponding cylinder of the internal combustion engine;
   a pressure safety valve for keeping a fuel pressure in the common rail below a predetermined high limit pressure by opening the pressure safety valve when the fuel pressure in the common rail exceeds the predetermined high limit pressure;
   a fuel pressure detecting means for detecting the fuel pressure in the common rail;
   an abnormally high-pressure detecting means for detecting that a detected value of the fuel pressure in the common rail detected by the fuel pressure detecting means exceeds a lower limit of an abnormally high-pressure region set lower than the high limit pressure and is in the abnormally high-pressure region; and
   a fuel pressure increasing means for controlling the flow rate of fuel to be injected through the fuel injection valve so that the fuel pressure in the common rail reaches the high limit pressure when the internal combustion engine is started in a state in which the detected value of the fuel pressure in the common rail is in an abnormally high-pressure region by the abnormally high-pressure detecting means.

2. An accumulator fuel injection system, as set forth in claim 1, wherein the fuel pressure increasing means suspends fuel injection through the fuel injection valve at every cylinder.

3. An accumulator fuel injection system, as set forth in claim 1, wherein the fuel pressure increasing means suspends fuel injection, through the fuel injection valve, at some cylinders.

4. An accumulator fuel injection system, as set forth in claim 2, comprising a fuel injection starting means for starting fuel injection, at the cylinders at which fuel injection through the fuel injection valve has been suspended, when the detected value of the fuel pressure in the common rail falls below the lower limit of the abnormally high-pressure region.

5. An accumulator fuel injection system, as set forth in claim 4, wherein the fuel injection starting means increases the number of cylinders, at which fuel injection is started, step by step.

6. An accumulator fuel injection system, as set forth in claim 4, wherein the fuel injection starting means starts fuel injection when a predetermined period of time elapses after the internal combustion engine is started.

7. An accumulator fuel injection system, as set forth in claim 6, comprising a start condition learning means for changing the setting of the predetermined period of time by learning.

8. An accumulator fuel injection system, as set forth in claim 4, wherein the fuel injection starting means starts fuel injection when the fuel pressure in the common rail is judged to be stable by monitoring the detected value of the fuel pressure in the common rail.

9. An accumulator fuel injection system, as set forth in claim 8, comprising a start condition learning means for changing the conditions for judging whether the fuel pressure in the common rail is stable, by learning.

* * * * *